United States Patent
Kuusela et al.

(10) Patent No.: US 8,411,645 B2
(45) Date of Patent: Apr. 2, 2013

(54) METHOD, SYSTEM, APPARATUS AND SOFTWARE PRODUCT FOR COMBINATION OF UPLINK DEDICATED PHYSICAL CONTROL CHANNEL GATING AND ENHANCED UPLINK DEDICATED CHANNEL TO IMPROVE CAPACITY

(75) Inventors: Markku Kuusela, Espoo (FI); Esa Malkamäki, Espoo (FI); Anna-Mari Vimpari, Oulu (FI); Antti Toskala, Espoo (FI); Jussi Numminen, Turku (FI)

(73) Assignee: Nokia Corporation, Espoo (FI)

( * ) Notice: Subject to any disclaimer, the term of this patent is extended or adjusted under 35 U.S.C. 154(b) by 1016 days.

(21) Appl. No.: 11/411,980

(22) Filed: Apr. 25, 2006

(65) Prior Publication Data
US 2006/0256757 A1 Nov. 16, 2006

Related U.S. Application Data

(60) Provisional application No. 60/675,304, filed on Apr. 26, 2005.

(51) Int. Cl.
*H04B 7/216* (2006.01)
(52) U.S. Cl. ........ 370/335; 370/342; 370/468; 370/474; 370/318; 455/450; 455/452.2
(58) Field of Classification Search .................. 370/342, 370/329, 335; 455/450–452.2, 522, 69
See application file for complete search history.

(56) References Cited

U.S. PATENT DOCUMENTS

| | | | |
|---|---|---|---|
| 6,587,447 B1 * | 7/2003 | Wang et al. | 370/335 |
| 6,771,620 B2 | 8/2004 | Butler | |
| 7,433,339 B2 * | 10/2008 | Kaipainen et al. | 370/335 |
| 7,787,430 B2 * | 8/2010 | Kaikkonen et al. | 370/342 |
| 7,804,850 B2 * | 9/2010 | Sebire et al. | 370/468 |
| 7,864,724 B2 * | 1/2011 | Kaikkonen et al. | 370/318 |
| 7,929,570 B2 * | 4/2011 | Lee et al. | 370/474 |
| 7,936,741 B2 * | 5/2011 | Vimpari et al. | 370/342 |
| 7,948,936 B2 * | 5/2011 | Lohr et al. | 370/329 |
| 2003/0045288 A1 * | 3/2003 | Luschi et al. | 455/434 |
| 2003/0058822 A1 | 3/2003 | Jou | |
| 2003/0076799 A1 * | 4/2003 | Kwak et al. | 370/335 |
| 2003/0100298 A1 * | 5/2003 | Butler | 455/422 |
| 2003/0193915 A1 * | 10/2003 | Lee et al. | 370/335 |
| 2005/0176430 A1 * | 8/2005 | Lee et al. | 455/436 |
| 2006/0116118 A1 * | 6/2006 | Charriere et al. | 455/423 |

FOREIGN PATENT DOCUMENTS

| | | |
|---|---|---|
| CN | 1290431 A | 4/2001 |
| cn | 1375956 A | 10/2002 |
| JP | 2002-542659 | 12/2002 |
| JP | 2003-501876 | 1/2003 |

(Continued)

OTHER PUBLICATIONS

3GPP TR 25.840 v4.0.0 (Dec. 2003); 3rd Generation Partnership Project; Technical Specification Group Radio Access Network; Terminal power saving features (Release 4).

(Continued)

*Primary Examiner* — Sharad Rampuria
(74) *Attorney, Agent, or Firm* — Squire Sanders (US) LLP (57) ABSTRACT

A method, apparatus, system, network element, and software product are used to provide a traffic signal, such as a voice over internet protocol (VoIP) signal, via high speed packet access. The traffic signal is prepared and provided via a high speed transmission, and a control signal is gated to produce a discontinuous transmission. This reduces interference, and therefore increases traffic capacity.

20 Claims, 6 Drawing Sheets

FOREIGN PATENT DOCUMENTS

| | | |
|---|---|---|
| JP | 2003-511898 | 3/2003 |
| RU | 2242091 | 12/2004 |
| WO | WO 00/62456 | 10/2000 |
| WO | WO 00/74292 | 12/2000 |
| WO | WO 01/10056 | 2/2001 |
| WO | WO 01/26269 | 4/2001 |
| WO | WO 01/99313 A1 | 12/2001 |
| WO | WO 02/15420 | 2/2002 |
| WO | 2006/038078 A2 | 4/2006 |

OTHER PUBLICATIONS

Russian National Standard GOST 28806-90; "Software quality. Terms and definitions;" pp. 80-87; Jan. 1, 1992.

Patent Office of the Russian Federation; "Official Action (Enquiry) of the State Examination;" pp. 1-2; Feb. 27, 2009.

Patent Office of the Russian Federation; "Notice of Allowance;" whole document; Nov. 2, 2009; No English translation available.

Japanese Patent Office; "Notice of Reasons for Rejection" (English translation); whole document; Jan. 9, 2010.

Office Action dated Oct. 11, 2012 issued by the State Intellectual Property Office in corresponding Chinese Patent Application No. 200680013937.6.

Taiwanese Official Letter (Jun. 18, 2012).

3GPP TSG RAN WG2 Meeting #45 "Introduction of EUL in MAC Specification," Shin-Yokohama, Japan, Oct. 15-19, 2004, section 4.2.3.2 Section 4.2.4; section 11.8.1.1.1.

* cited by examiner

METHOD, SYSTEM, APPARATUS AND SOFTWARE PRODUCT FOR COMBINATION OF UPLINK DEDICATED PHYSICAL CONTROL CHANNEL GATING AND ENHANCED UPLINK DEDICATED CHANNEL TO IMPROVE CAPACITY

CROSS-REFERENCE TO RELATED APPLICATION

This application claims priority to U.S. Provisional Patent Application 60/675,304 filed Apr. 26, 2005.

FIELD OF INVENTION

The present invention relates generally to voice over internet protocol (VoIP) in relation to Wideband Code Division Multiple Access (WCDMA) High Speed Downlink Packet Access (HSDPA) and also WCDMA High Speed Uplink Packet Access (HSUPA).

BACKGROUND OF INVENTION

A universal mobile telecommunications system (UMTS) is a third-generation mobile communications system that evolved from a global system for mobile communications system (GSM). The UMTS is intended to provide enhanced mobile communications services based on the GSM core network and wideband code-division multiple-access (WCDMA) technology. The UMTS terrestrial radio access network (UTRAN) is a radio access network for supporting WCDMA access technology in the UMTS.

Typically, the interface between a user equipment (UE) and the UTRAN has been realized in the related art through a radio interface protocol established in accordance with radio access network specifications describing a physical layer (L1), a data link layer (L2) and a network layer (L3). These layers are based on the lower three layers of an open system interconnection (OSI) model that is well known in communications systems.

For example, the physical layer (PHY) provides information transfer service to a higher layer and is linked via transport channels to a medium access control (MAC) layer. Data travels between the MAC layer at L2 and the physical layer at L1, via a transport channel. The transport channel is divided into a dedicated transport channel and a common transport channel depending on whether a channel is shared. Also, data transmission is performed through a physical channel between different physical layers, namely, between physical layers of a sending side (transmitter) and a receiving side (receiver).

In this example of a typical system in the related art, the second layer L2 includes the MAC layer, a radio link control (RLC) layer, a broadcast/multicast control (BMC) layer, and a packet data convergence protocol (PDCP) layer. The MAC layer maps various logical channels to various transport channels. The MAC layer also multiplexes logical channels by mapping several logical channels to one transport channel. The MAC layer is connected to an upper RLC layer via the logical channel. The logical channel can be divided into a control channel for transmitting control plane information, and a traffic channel for transmitting user plane information according to the type of information transmitted. The term "traffic" can sometimes be understood to cover control information, but in this present specification the term "traffic signal" will refer to a data signal in the user plane.

The MAC layer within L2 is divided into a MAC-b sublayer, a MAC-d sublayer, a MAC-c/sh sublayer, a MAC-hs sublayer and a MAC-e sublayer according to the type of transport channel being managed. The MAC-b sublayer manages a broadcast channel (BCH), which is a transport channel handling the broadcast of system information. The MAC-c/sh sublayer manages common transport channels such as an FACH (Forward Access Channel) or a DSCH (Downlink Shared Channel) that is shared by other terminals. The MAC-d sublayer handles the managing of a DCH (Dedicated Channel), namely, a dedicated transport channel for a specific terminal. In order to support uplink and downlink high speed data transmissions, the MAC-hs sublayer manages an HS-DSCH (High Speed Downlink Shared Channel), namely, a transport channel for high speed downlink data transmission, and the MAC-e sublayer manages an E-DCH (Enhanced Dedicated Channel), namely, a transport channel for high speed uplink data transmissions.

In this example of a typical related art system, a radio resource control (RRC) layer located at the lowest portion of the third layer (L3) controls the parameters of the first and second layers with respect to the establishment, reconfiguration and release of radio bearers (RBs). The RRC layer also controls logical channels, transport channels and physical channels. Here, the RB refers to a logical path provided by the first and second layers of the radio protocol for data transmission between the terminal and the UTRAN. In general, the establishment of the RB refers to stipulating the characteristics of a protocol layer and a channel required for providing a specific data service, and setting their respective detailed parameters and operation methods.

A typical HSUPA (High Speed Uplink Packet Access) of the related art will now be briefly described. HSUPA is a system allowing a terminal or UE to transmit data to the UTRAN via the uplink at a high speed. The HSUPA employs an enhanced dedicated channel (E-DCH), instead of the related art dedicated channel (DCH), and also uses a HARQ (Hybrid Automatic Repeat Request) and AMC (Adaptive Modulation and Coding), required for high-speed transmissions, and a technique such as a Node B-controlled scheduling. For the HSUPA, the Node B transmits to the terminal downlink control information for controlling the E-DCH transmission of the terminal. The downlink control information includes response information (ACK/NACK) for the HARQ, channel quality information for the AMC, E-DCH transmission rate allocation information for the Node B-controlled scheduling, E-DCH transmission start time and transmission time interval allocation information, transport block size information, and the like. The terminal transmits uplink control information to the Node B. The uplink control information includes E-DCH transmission rate request information for Node B-controlled scheduling, UE buffer status information, UE power status information, and the like. The uplink and downlink control information for the HSUPA are transmitted via physical control channels such as an E-DPCCH (Enhanced Dedicated Physical Control Channel) in the uplink and E-HICH (HARQ acknowledgement Indication channel), E-RGCH (Relative Grant channel) and E-AGCH (Absolute Grant channel) in the downlink. For the HSUPA, a MAC-d flow is defined between the MAC-d and MAC-e. Here, a dedicated logical channel such as a DCCH (Dedicated Control Channel) or a DTCH (Dedicated Traffic Channel) is mapped to the MAC-d flow. The MAC-d flow is mapped to the transport channel E-DCH and the transport channel E-DCH is mapped to the physical channel E-DPDCH (Enhanced Dedicated Physical Data Channel). The dedicated logical channel can also be directly mapped to the transport channel DCH. In this case, the DCH is mapped to the physical channel DPDCH (Dedicated Physical Data Channel).

According to Wideband Code Division Multiple Access (WCDMA) standards, the uplink (UL) Dedicated Physical Control Channel (DPCCH) carries control information generated at layer 1, which is the physical layer (PHY). The layer 1 control information consists, for example, of known pilot bits to support channel estimation for coherent detection, transmit power control (TPC) for the downlink (DL) dedicated physical channel (DPCH), feedback information (FBI), and an optional transport format combination indicator (TFCI). Uplink (UL) DPCCH is continuously transmitted, and there is one UL DPCCH for each radio link.

When there are many users in a cell, a high capacity is desirable for VoIP on High Speed Downlink Packet Access (HSDPA) and HSUPA, and then the interference caused by continuously transmitted UL DPCCHs becomes a limiting factor for capacity. It would therefore be desirable to improve the capacity for VoIP by revising the limiting factor.

Data traffic (e.g. VoIP) is transmitted on an Enhanced Dedicated Channel (E-DCH), which is transmitted on an Enhanced Dedicated Physical Data Channel (E-DPDCH). Control signaling associated with E-DPDCH is transmitted on an Enhanced Dedicated Physical Control Channel (E-DPCCH). These channels are transmitted only when there is data to be transmitted and when the transmission has been granted by the network, i.e., these transmissions are discontinuous. The Dedicated Physical Control Channel (DPCCH) is a dedicated control channel which carries pilot bits for channel and signal to interference ratio (SIR) estimation purposes, and it also carries power control bits for DL DPCH, as well as TFCI bits indicating transport format used on DPDCH, and FBI bits carrying feedback information from User Equipment UE to base station Node B (TFCI and FBI bits are, however, not needed if E-DPDCH is used); this transmission is continuous, even if there is no data to transmit for a while, and this is acceptable with circuit switched services which typically send continuously. However, for bursty packet services, continuous DPCCH transmission causes quite a big overhead.

It is known in the art to use UL DPCCH gating in the context of the "Terminal power saving feature." See, for example, section 8.1.2 of 3GPP TR 25.840, V4.0.0 (2003-12), "Terminal Power Saving Features." However, the full capabilities of UL DPCCH gating have not yet been exploited with HSUPA transmissions.

DPCCH gating involves breaks in the DPCCH transmission or DTX, which is a discontinuous transmission using the DPCCH. Generally speaking, DTX is a battery-saving feature that cuts back the output power when a person stops speaking. DPCCH gating is known, at least for power saving purposes. Earlier, some regular (or pseudo-random) DTX patterns have been considered. However, UL DPCCH gating has thus far not been fully exploited in the context of HSDPA and HSUPA transmissions.

SUMMARY OF INVENTION

The present invention discloses how UL DPCCH gating can be combined with E-DCH transmission to improve capacity in the context of, for example, VoIP on HSUPA or any other discontinuous data transmission. Accordingly, the UL DPCCH should be transmitted when E-DCH is transmitted. E-DCH transmission would be controlled by scheduling or Hybrid Automatic Repeat Request (HARQ) retransmissions to restricted HARQ process or processes. Alternatively, the UL DPCCH should be transmitted in case of lengthy E-DCH transmission inactivity; M slots of DPCCH would be transmitted to prevent a transmission gap longer than N slots (e.g. 10 ms). DPCCH could also be transmitted whenever retransmission would be possible, until a maximum number of retransmissions has been completed. A Node B monitors the retransmission transmission time interval (TTI).

The retransmission TTI can be used also for a new transmission, and the new transmission can replace the retransmission, so that the retransmission would be performed in the next TTI (which would then be monitored by the Node B if waiting for retransmission, and noticing a new transmission instead of the retransmission). Alternatively, retransmission would be done when needed, and possible new data could be transmitted in the next TTI. It could either be indicated that there is transmission in the next TTI, or the Node B automatically checks the next TTI after a retransmission.

According to this invention, the DPCCH gating (DTX) is tied to E-DCH transmission. In other words, the gating is at least partly controlled by E-DCH transmission, and this is a significant point of novelty. This control of the gating could be via a scheduling operation (for scheduled transmission), or via known transmission positions (for non-scheduled transmission), or via ACK/NAKs (for retransmissions). Furthermore, that gating is partly independent from E-DCH transmission, and thus is e.g., periodic or conforming to some other known pattern. Hence, the UL DPCCH would be transmitted only when E-DCH is transmitted, or in case of a long inactivity of E-DCH transmission the UL DPCCH would be transmitted according to a predefined pattern to prevent long UL DPCCH transmission gaps.

The HSUPA includes two modes: scheduled and non-scheduled mode. In the scheduled mode, the Node B controls when the UE is allowed to send, and thus the Node B knows when the UE is going to send. If the DPCCH transmission is tied to E-DPDCH/E-DPCCH transmission, then the Node B also knows when to expect DPCCH. For instance, the rule could be that the UE must transmit DPCCH whenever it has a scheduling grant (i.e., when it is allowed to transmit), even if the buffer is already empty. Thus, to stop DPCCH transmission, Node B should stop E-DPDCH transmission. Especially with a TTI of two milliseconds (ms), the Node B has means to restrict the UE transmission into certain HARQ processes. Then the UE would send at least DPCCH in all these HARQ processes.

As mentioned, the HSUPA also includes a non-scheduled mode. In the non-scheduled mode, the network can allow a maximum data rate for a given MAC-d flow. Due to the periodic nature of VoIP, the new packets arrive at known time instants (e.g., every 20 ms) and Node B can easily learn these patterns. For 10 ms TTI, this means that there is new transmission in every other TTI (unless a retransmission replaces/postpones it). Thus DPCCH (possibly with E-DPDCH and E-DPCCH) can be sent in every other 10 ms TTI and DTX in the others, unless a retransmission of a packet on E-DPDCH is needed. After a retransmission, the DPCCH can be transmitted during the next TTI, even if there is no new transmission on E-DPDCH to be transmitted there.

For a 2 ms TTI, non-scheduled transmission can be restricted to some HARQ processes only. Thus, DPCCH transmission can also be restricted to these same HARQ processes.

For retransmissions, there are at least two possible strategies for DPCCH gating. First, DPCCH is always transmitted where retransmission could be possible (max number of retransmissions would set limit). Second, DPCCH transmission can be controlled by ACK/NAK; that is, DPCCH is sent together with the retransmission only when Node B sends NAK. The first of these two approaches is more robust to signaling errors, whereas the second reduces DPCCH transmissions more. With the first approach, Node B would always monitor the retransmission TTI and thus, the retransmission TTI could be used also for a new data transmission, with a new data indication. The new transmission can replace the retransmission, and the retransmission would be done in the next TTI (which would then be monitored by Node B if waiting for retransmission, and noticing a new transmission instead of the retransmission); alternatively, retransmission would be done when needed and possible new data could be transmitted in the next TTI (it could either be indicated that there is transmission in next TTI, or Node B should check the next TTI anyway after a retransmission).

In addition to E-DCH controlled DPCCH gating, there should be some DPCCH transmission pattern (regular or pseudo random) to guarantee that there are not gaps having excessive length. As an example, voice over internet protocol (VoIP) transmission can be used on E-DCH. Let us assume that the scheduling time of each (VoIP) user on HSUPA is semi-static, even though this assumption is not absolutely necessary. In other words, the Node B knows when to receive data on the E-DCH from a specific user. This could be done, for example, by using a non-scheduled mode for HSUPA with a 2 ms HSUPA transmission time interval (TTI); for 2 ms TTI, non-scheduled transmission could be restricted to some HARQ processes.

In case of 10 ms TTI, a simple principle with VoIP service using a packet every 20 ms would be, for example, to allow transmission of only every second ARQ process (odd or even). Further optimization could include taking into account an additional process for when retransmission is needed and there would be a conflict between the retransmission and the next packet arriving (assuming delay budget allows one retransmission), and more processes could be used only when retransmission is needed then.

In particular, the retransmission could be delayed by one 10 ms frame taking the place of a normally unused process. This could be known for example by the base transceiver station (BTS), as when having a new data indicator for process 1 even when the E-DCH HARQ Acknowledgement Indicator Channel (E-HICH) has indicated an ACK, and then the BTS would expect to receive the following 10 ms as well, now including the retransmission for the earlier packet. The advantage of this method would be that the BTS would have a priori knowledge about whether the DTX is taking place in the next 10 ms or not. Thus, without re-transmissions (and with continuous operation), one would always be using fully every other 10 ms TTI, and the TTI in between would be mostly DTX (some slots with DPCCH would likely be needed for TPC operation).

Alternatively, the new transmissions could be delayed by one 10 ms frame, taking the place of normally unused process and without delaying the retransmission. Indicating retransmission in the normally allowed frame (HARQ process) would inform the Node B that the new packet transmission (replaced by the retransmission) would be in the next (normally unused) process, and it would use that HARQ process also for possible retransmission. This alternative has the advantage of not needing to modify the BTS ARQ process handling from the current process structure, but could create uncertainty about the existence of a DTX period or not (which would be dependant on whether there was additional data or not after the re-transmission). Note that here the DTX could imply stopping of all the transmission, including DPCCH as well.

A "next TTI E-DCH transmission" indication (e.g. 2 ms before E-TFCI transmission) could be applied with the preamble-pattern idea, especially in case of a long maximum gap length. Advantages of the present invention include reduced interference leading to improved capacity, in addition to UE power savings leading to longer battery life.

DETAILED DESCRIPTION

An embodiment of the invention will now be described for purposes of illustration only, and without in any way foreclosing the numerous other embodiments that can implement the present invention. According to this embodiment, gating should be controlled by the UTRAN, and UTRAN should control the initiation and termination of the gated DPCCH transmission. The network could determine the feasibility of operating in that way, based upon the statistics of the signal, or based upon the possible quality of service (QoS) parameters given, such as conversational packet-switched radio bearer (PS RB), particular delay requirements and data rates, et cetera. This gating requirement is useful to guarantee the functionality of the soft handover (SHO) in the case that not all the Node Bs in the active set support gating.

UTRAN could initiate and/or terminate the gating, for example by monitoring the statistics of the traffic. The network should have the task of deciding what kind of gating pattern and rate should be used, and also the task of signaling the needed information to the Node B(s) using, for example, Node B Application part (NABP) signaling and to the UE using, for example, radio resource control (RRC) signaling. The Node B should preferably know when UL DPCCH is transmitted or is not transmitted, and in any case should at least know if gating is used or not. Otherwise, serious problems with synchronization, power control, and channel estimation could be expected. However, Node B might not necessarily need to know all the transmissions beforehand, and instead might need to know only the basic gating pattern, and the UE could also autonomously transmit during the gating pattern gap periods. Here it is assumed that the Node B knows when the UL DPCCH gating is used, when UL DPCCH is transmitted/not transmitted, and the methods used for indicating data transmission in case of initial transmission and in case of retransmission.

In a first approach, gating patterns for UL DPCCH can be designed so that, for example, the UL DPCCH is transmitted once in N milliseconds (ms). The duration of the UL DPCCH transmission is given M slots. The N milliseconds could start either from the end of the previous transmission, or alternatively the pattern could be defined by the network to be independent from the E-DCH transmissions. If the N milliseconds start from the end of the previous transmission, then the UL DPCCH transmission precedes the transmission of E-DCH, and it continues together with data transmission, the duration of the gating period being M slots, including the data transmission TTI.

Alternatively, in a second approach, if the gating pattern is defined by the network to be independent from the E-DCH transmissions, then the UL DPCCH is transmitted once in N ms, and when there is data transmission this could be disclosed via the UL DPCCH transmission period preceding the transmission; the duration of the UL DPCCH transmission is given by M slots, but the UL DPCCH transmission continues together with the E-DPDCH and E-DPCCH transmissions, in case E-DPDCH and E-DPCCH are transmitted (the N ms could start either from the end of the previous transmission or the pattern could be defined by the network to be independent from the E-DCH transmissions). Higher layer signalling is used to tell Node B and UEs about the values of M and N, and which of the above gating approaches is used, if not fixed by the specification to have only one possibility.

In a third approach, information about whether or not there is data transmission in the next TTI is provided using the UL DPCCH transmission period preceding the data transmission. A method to do this could be, for example, starting E-TFCI one TTI or 2 ms early, with the E-DPCCH having a 2 ms structure, or the E-DPCCH not always occurring when the DPCCH occurs (i.e. only when needed). Another method to do this could be defining a new UL DPCCH structure to be used with gating. The TFCI/FBI bits would not be needed (if no DPDCH transmission is assumed with gating and if HSDPA with F-DPCH assumed in downlink); the TFCI/FBI bits of one TTI or 2 ms or M slots could be reused to inform if there is transmission in the next TTI, or be directly used for the next TTI E-TFCI. Regarding the E-DCH transmission, a grant and available power would be needed, for non-scheduled MAC-d flows the non-scheduled granted rate would be needed, and for a scheduled transmission the serving grant would be needed (with an allowed, active HARQ process).

If a gating pattern is designed according to VoIP only, then due to the non-VoIP-related transmissions (e.g. signalling radio bearer SRB) transmission between the gaps should be allowed, and thus DTX detection at Node B would be needed. On the other hand, if the semi-static scheduling time of each VoIP user includes also possible re-transmissions and non-VoIP related transmissions, then no transmission during the gaps would be needed. Also the unused VoIP retransmissions could be used for other traffic (if not limited by the HARQ process usage restrictions). Gating could be defined for a larger number of retransmissions than are actually allowed, and the extra retransmission TTIs could be used for other traffic transmission to ensure the possibility of also transmitting other traffic. With thus third gating pattern approach, other traffic than VoIP transmissions would be possible, with gating power optimized for only VoIP, without any gating pattern considerations.

Figure 1:
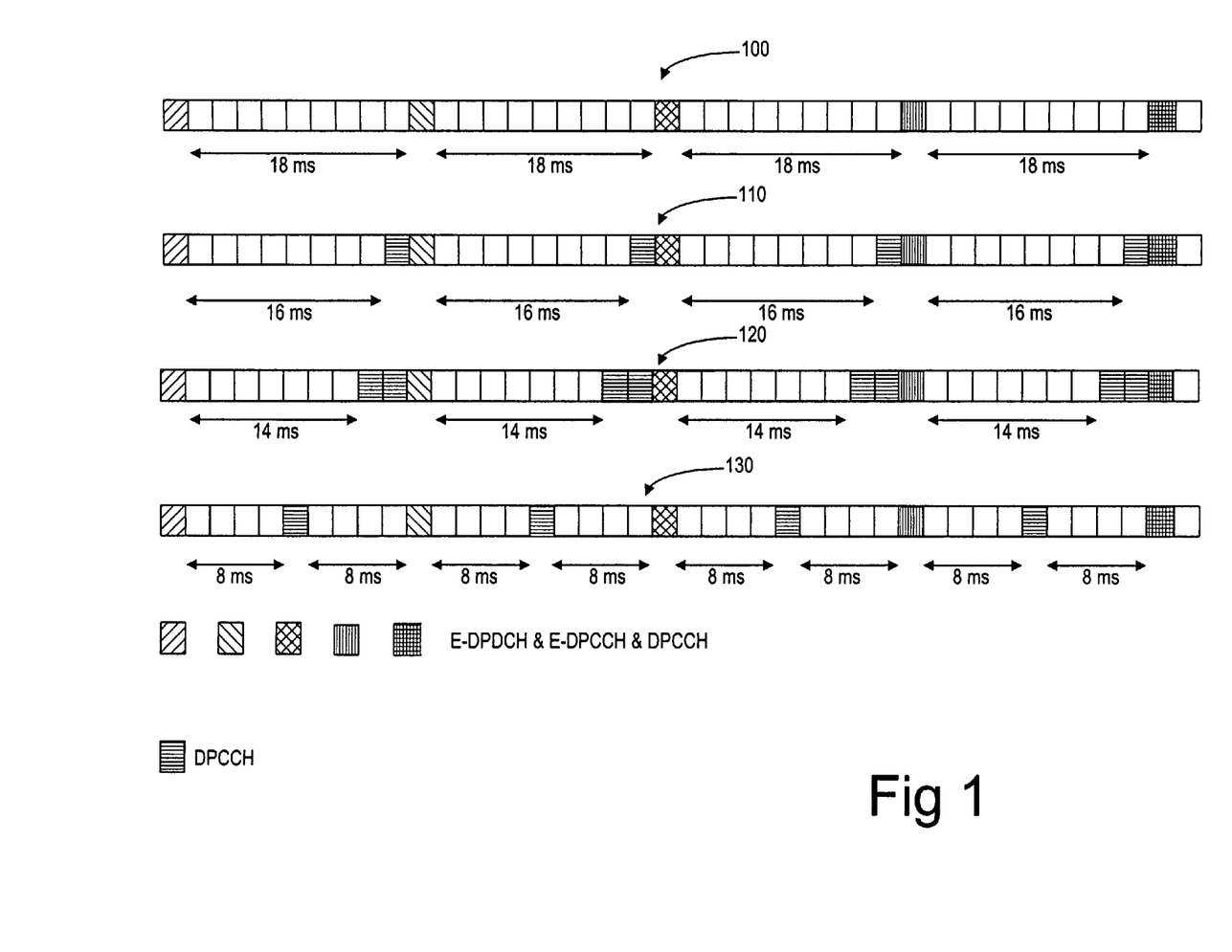
FIG. 1 shows possible gating patterns for a two-millisecond E-DCH, which is transmitted once in 20 milliseconds.

To illustrate the differences between these gating approaches, in FIG. 1 are presented possible gating patterns for a 2 ms E-DCH. Here it is assumed that E-DCH is transmitted once in a 20 ms interval. In FIG. 1, "M" is assumed to be a multiple of three.

Cases 110 and 120 in FIG. 1 correspond to the second gating pattern approach, where the gating of DPCCH is switched off only preceding the E-DCH transmission. In case 110, the parameter "M" equals 4 ms (i.e., M=6 slots), whereas for case 120 the parameter M equals 6 ms (i.e. M=9 slots). These could correspond also to the third gating pattern approach, in case there would always be transmission after the UL DPCCH transmission. For the third gating pattern approach, parameter M equals 2 ms in case 110 of FIG. 1, whereas parameter M equals 4 ms for case 120 of FIG. 1.

Case 130 shown in the FIG. 1 corresponds to the periodical gating pattern approach (i.e. the first gating pattern approach), and parameters N and M have values 10 ms and 2 ms, respectively. To adjust the power level of UL DPCCH after a long transmission gap before data transmission on E-DPDCH, the aid of the short preambles could be used, for example.

The third gating pattern approach, with "next TTI E-DCH transmission" indication (e.g. 2 ms early E-TFCI transmission) and the preamble-pattern concept can be applied especially in case of a long maximum gap length (e.g. greater than a certain threshold length). The E-DPCCH could start 2 ms earlier and thus, E-TFCI would be received 2 ms before the E-DCH. Alternatively, some unnecessary DPCCH bits on the M slots could be reused to send the early E-TFCI (or a simple indication that there is E-DCH transmission in the next TTI).

An idea of the present invention is that DPCCH is not sent when there is no data to send. However, power control and channel estimation require that DPCCH is transmitted often enough, and therefore sometimes DPCCH has to be transmitted even if no data is transmitted on E-DPDCH. Here the present invention includes controlling the gating (i.e. not transmitting DPCCH) based on the E-DCH transmission. This is equivalent to an E-DPDCH transmission (E-DCH is transmitted on E-DPDCH) as well as to E-DPCCH transmission (associated control channel which is transmitted together with E-DPDCH).

In this embodiment, VoIP packets are assumed to be sent on E-DCH (transport channel) which is sent on the enhanced dedicated physical data channel E-DPDCH. The idea is to try and avoid DPCCH transmission as much as possible when E-DPDCH is not transmitted. There is one VoIP packet every 20 ms, which means that especially with 2 ms TTI there is a gap of 18 ms in between two VoIP transmissions, as seen in case 100 of FIG. 1. In addition, there are silent periods in speech and during those periods a silence indicator (SID) frame is sent once in 160 ms. Thus there is quite a lot of DTX (discontinuous transmission) on a user's E-DPDCH. Furthermore, the Node B should be as much as possible aware when DPCCH is or is not transmitted.

Figure 2:
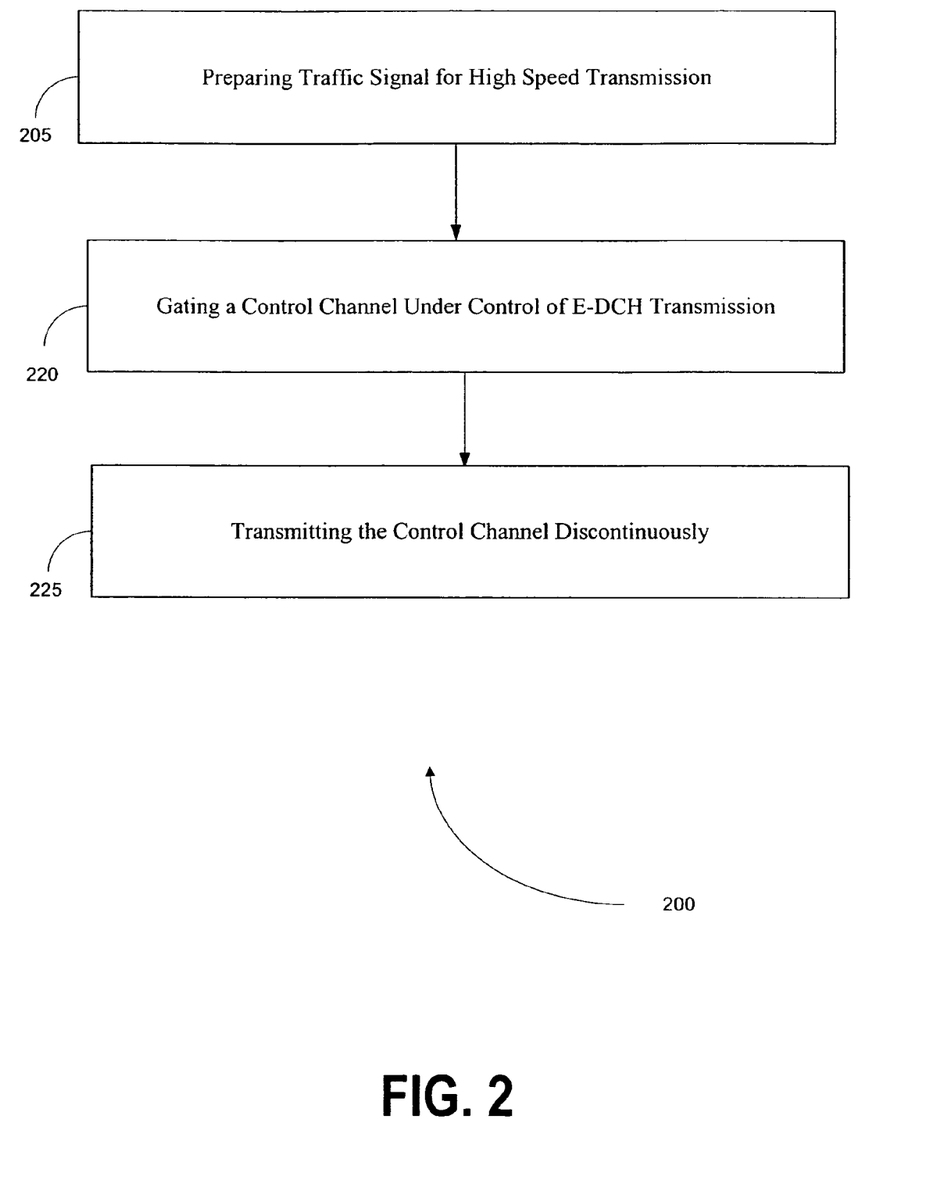
FIG. 2 shows a method according to an embodiment of the present invention.

FIG. 2 illustrates a simple embodiment of the method of the present invention, for providing a traffic signal via high speed packet access. The term "traffic signal" could be understood to cover a control channel, but in this present specification the term "traffic signal" will refer to a data signal. First, the traffic signal is prepared 205 for high speed transmission. Then the control channel is gated 220 to produce a discontinuous transmission 225 of the control channel. The gating 220 is at least partly controlled by an enhanced dedicated channel transmission.

Figure 3:
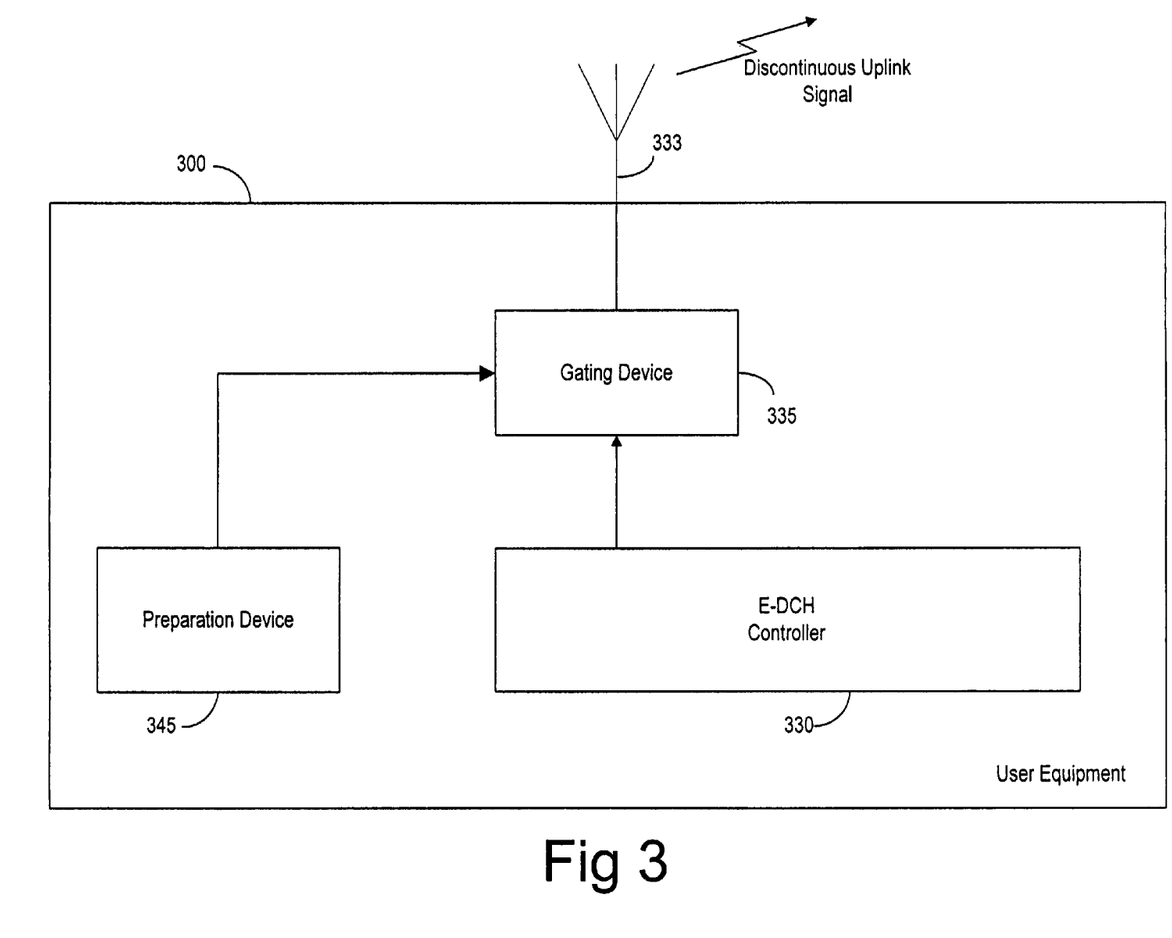
FIG. 3 shows user equipment according to an embodiment of the present invention.

Turning now to FIG. 3, user equipment 300 is arranged to provide a signal via high speed uplink packet access. The user equipment includes a preparation device 345 configured to prepare (i.e. provide) the traffic signal for high speed transmission. The user equipment also includes a gating device 335 configured to gate the control channel so as to produce a discontinuous transmission. Additionally, the user equipment has a controller 330, which is configured to at least partly control the gating device, via an enhanced dedicated channel transmission. An antenna 333 provides the discontinuous uplink signal.

Figure 4:
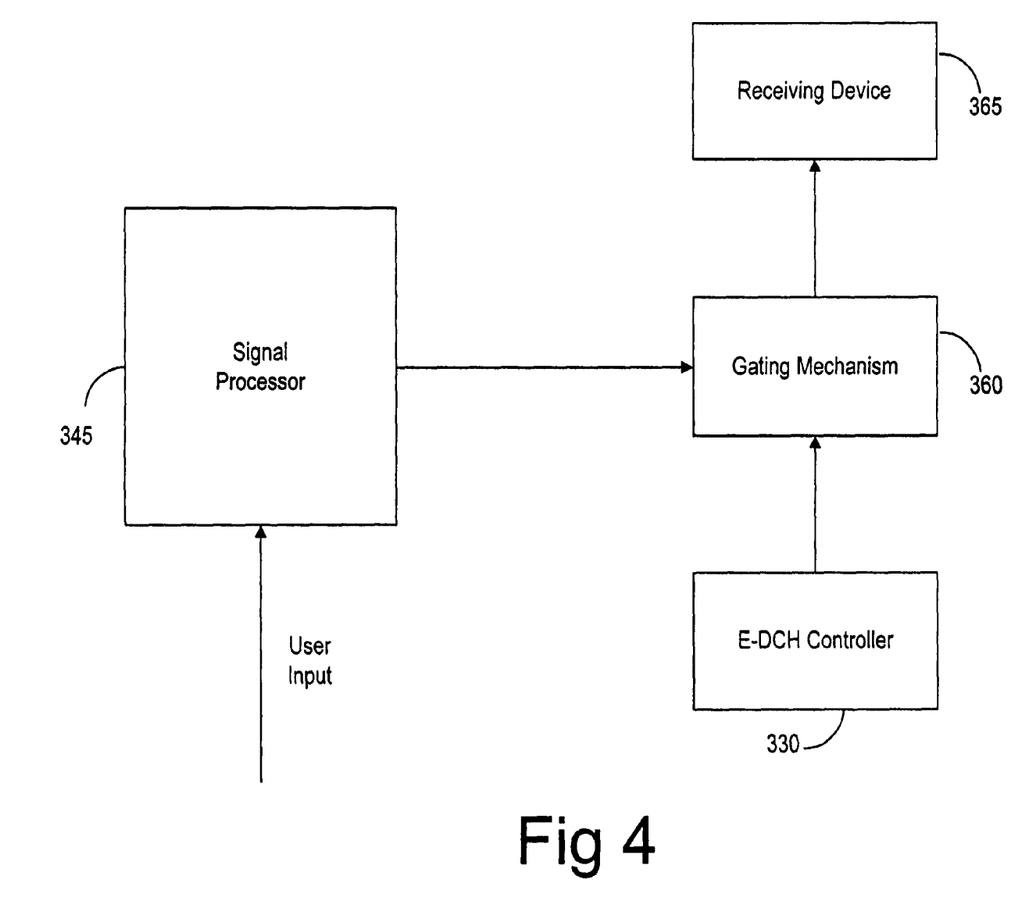
FIG. 4 shows a system according to an embodiment of the present invention.

FIG. 4 illustrates a system according to an embodiment of the present invention. A signal processor 345 is configured to prepare the traffic signal for high speed transmission. A gating mechanism 360 is configured to gate the control channel so as to produce a discontinuous transmission. A receiving device 365 is for receiving the traffic signal. The gating is at least partly controlled by an enhanced dedicated channel transmission 330.

Figure 5:
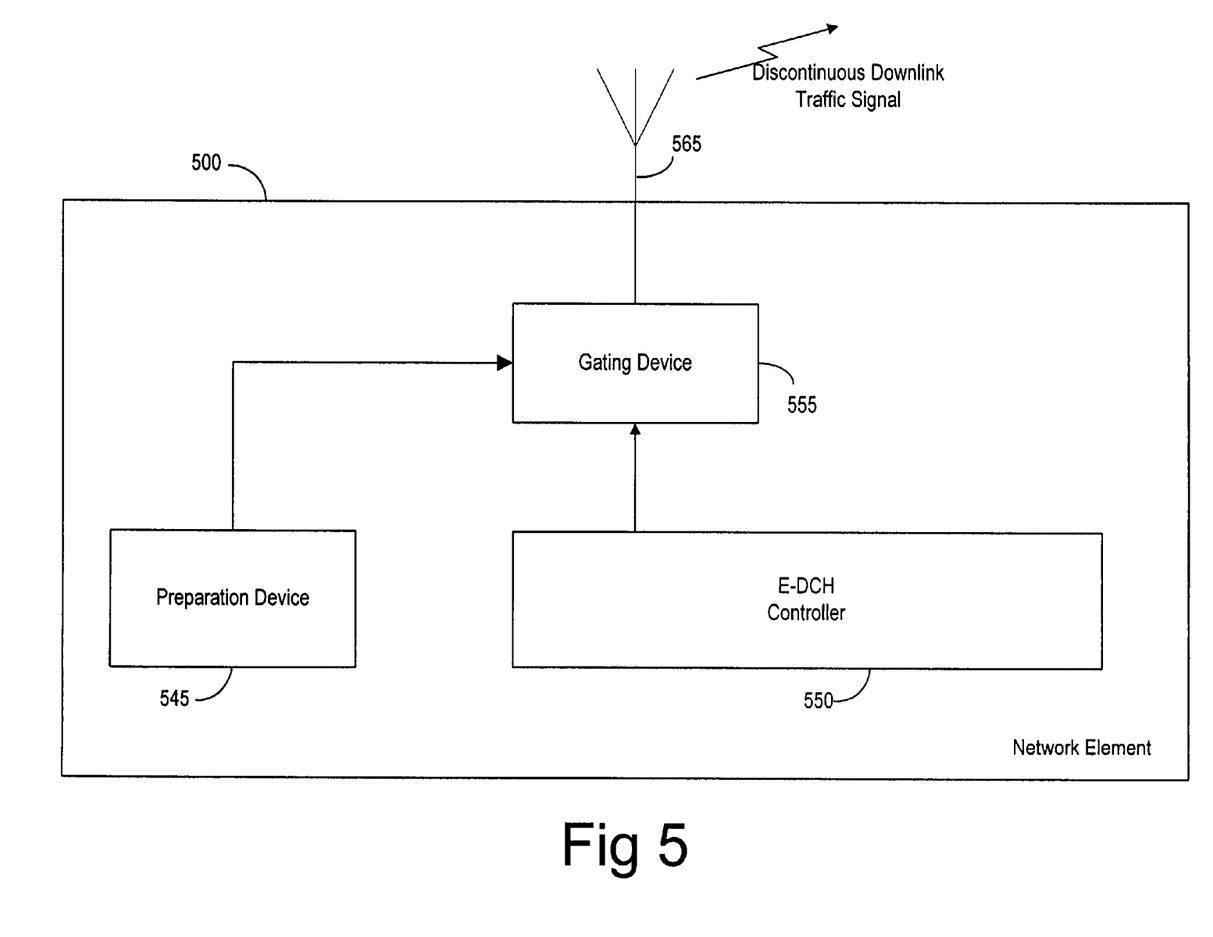
FIG. 5 shows a network element according to an embodiment of the present invention.

FIG. 5 is similar to FIG. 3, and merely shows a comparable embodiment at the network side instead of at the user equipment side. The network element 500 is arranged to provide a traffic signal via high speed downlink packet access. The network element includes a preparation device 545 configured to prepare the traffic signal for high speed transmission. The network element also includes a gating device 555 configured to gate the control channel so as to produce a discontinuous transmission. Additionally, the network element has a controller 550, which is configured to at least partly control the gating device, via an enhanced dedicated channel transmission. An antenna 565 provides the discontinuous downlink signal.

Figure 6:
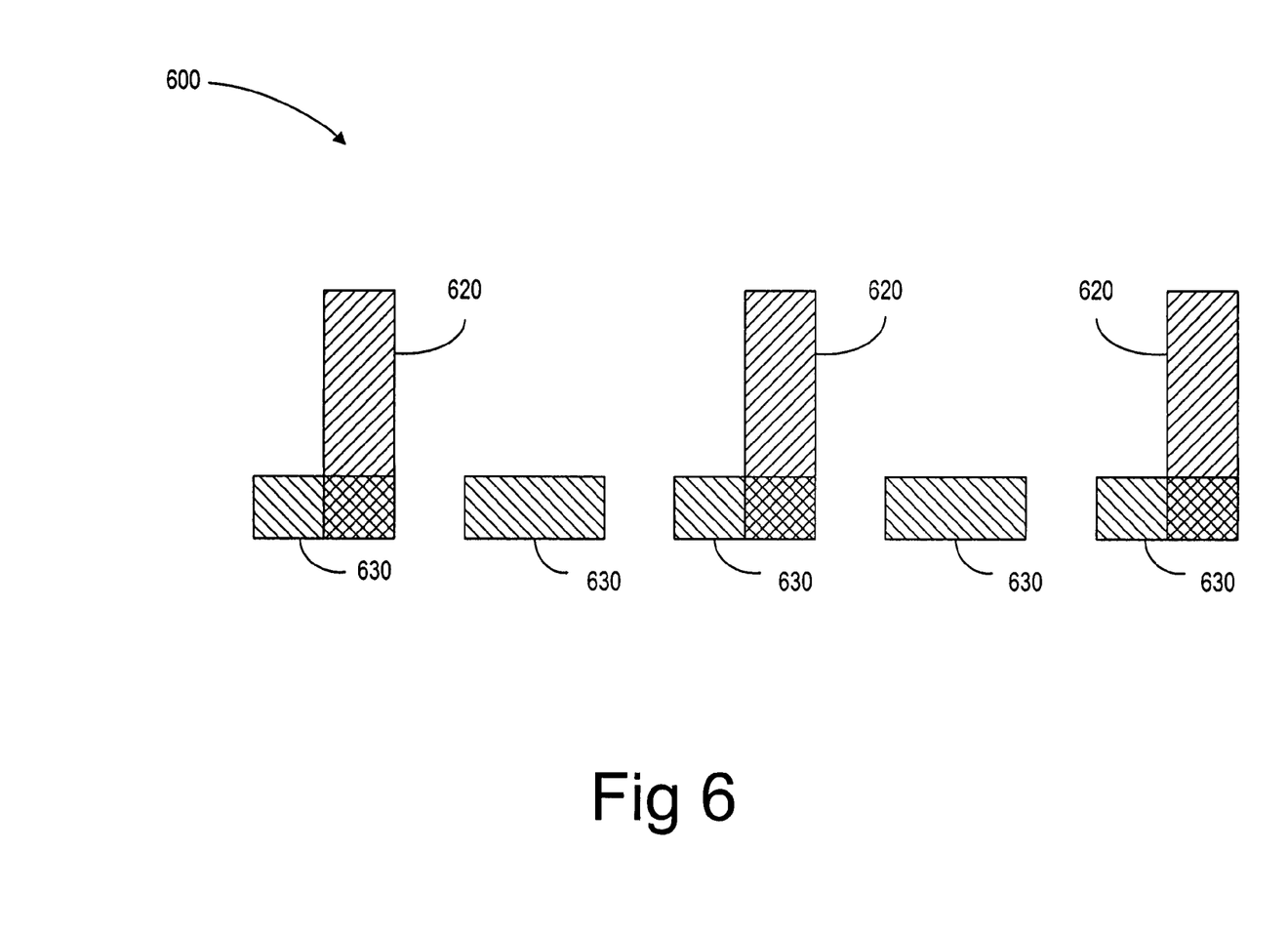
FIG. 6 shows gating according to an embodiment of the present invention.

FIG. 6 is a simplified illustration of gating according to an embodiment of the present invention. The DPCCH 630 is gated, instead of being continuously transmitted. This gating is at least partly controlled by the E-DCH data transmission 620 (the DPCCH is always transmitted when there is data on the E-DCH). And, this gating is partly not controlled by the E-DCH transmission (between E-DCH transmissions).

The embodiment described above can be implemented using a general purpose or specific-use computer system, with standard operating system software conforming to the method described herein. The software product is designed to drive the operation of the particular hardware of the system, and can be compatible with other system components and I/O controllers. The computer system of this embodiment includes, for example, the processor 345 shown in FIG. 4, comprising a single processing unit, multiple processing units capable of parallel operation, or the processor can be distributed across one or more processing units in one or more locations, e.g., on a client and server, or including controller 330. The software product of this embodiment will also utilize a memory unit which may comprise any known type of data storage and/or transmission media, including magnetic media, optical media, random access memory (RAM), read-only memory (ROM), a data cache, a data object, etc. Moreover, similar to the processor, the memory may reside at a single physical location, comprising one or more types of data storage, or be distributed across a plurality of physical systems in various forms.

It is to be understood that the present figures, and the accompanying narrative discussions of best mode embodiments, do not purport to be completely rigorous treatments of the method, system, mobile device, and software product under consideration. A person skilled in the art will understand that the steps and signals of the present application represent general cause-and-effect relationships that do not exclude intermediate interactions of various types, and will further understand that the various steps and structures and devices described in this application can be implemented by a variety of different sequences and configurations of hardware and/or software, in various different combinations which need not be further detailed herein.

What is claimed is:

1. A method comprising:
providing a dedicated channel for transmission of data, wherein the transmission of data is scheduled by a Node B;
gating a dedicated physical control channel to produce a discontinuous transmission,
receiving signaling associated with at least one gating pattern for the dedicated physical control channel, and
providing a control transmission via the dedicated physical control channel based on the data transmission or the gating pattern,
wherein the gating of the dedicated physical control channel is at least partly dependent upon whether the Node B has scheduled the transmission of data on said dedicated channel during the discontinuous transmission, and
wherein the data transmission on said dedicated channel controls at least one amount or degree of a plurality of transmission gaps in the discontinuous transmission.

2. The method of claim 1,
wherein the dedicated channel is an enhanced dedicated channel, and
wherein the discontinuous transmission is an uplink transmission.

3. The method of claim 1, wherein the gating is timed to minimize interference caused by the discontinuous transmission.

4. A non-transitory computer readable medium encoded with
a software data structure for performing the method of claim 1.

5. The method of claim 1, further comprising applying an indication of a next transmission time interval enhanced dedicated channel transmission.

6. The method of claim 5, wherein the indication is applied in case of a long maximum gap length.

7. The method of claim 1, wherein the data for transmission comprises a voice over internet protocol signal.

8. The method of claim 1, wherein the data for transmission is transmitted via high speed packet access.

9. The method of claim 1,
wherein the discontinuous transmission includes transmitting a plurality of hybrid automatic repeat request retransmissions.

10. The method of claim 1, wherein the allowed transmission time on said dedicated channel is a retransmission time of a packet.

11. The method of claim 1, wherein the allowed transmission time on said dedicated channel is an initial transmission time of a packet.

12. An apparatus comprising:
means for providing a dedicated channel for transmission of data, wherein the transmission of data is scheduled by a Node B;
means for gating a dedicated physical control channel to produce a discontinuous transmission,
means for receiving signaling associated with at least one gating pattern for the dedicated physical control channel, and
means for providing a control transmission via the dedicated physical control channel based on the data transmission on said dedicated channel or the gating pattern,
wherein the gating of the dedicated physical control channel is at least partly dependent upon whether the Node B has scheduled the transmission of data on said dedicated channel during the discontinuous transmission, and
wherein the data transmission on said dedicated channel controls at least one amount or degree of a plurality of transmission gaps in the discontinuous transmission.

13. An apparatus comprising:
a preparation device configured to provide a dedicated channel for transmission of data, wherein the transmission of data is scheduled by a Node B;
a gating device configured to gate a dedicated physical control channel to produce a discontinuous transmission in the dedicated physical control channel, and a receiver configured to receive signaling associate with at least one gating pattern for the dedicated physical control channel, wherein the preparation device is configured to provide a control transmission via the dedicated physical control channel based on the data transmission or the gating pattern, and wherein the gating of the dedicated physical control channel is at least partly dependent upon whether the Node B has scheduled the transmission of data on said dedicated channel during the discontinuous transmission, and wherein the data transmission on said dedicated channel controls at least one amount or degree of a plurality of transmission gaps in the discontinuous transmission.

14. The apparatus of claim 13, wherein the dedicated channel is an enhanced dedicated channel, wherein the data transmission on the enhanced dedicated channel controls the gating device using a controller, and wherein the apparatus further comprises a timer configured to time the gating device so as to minimize interference caused by the discontinuous transmission.

15. The apparatus of claim 13, further comprising an application module configured to apply an indication of a next transmission time interval enhanced dedicated channel transmission.

16. The apparatus of claim 15, wherein the indication is applied in case of a long maximum gap length.

17. The apparatus of claim 13, wherein the data transmission is a voice over internet protocol signal, and wherein the apparatus is a network element or is located at user equipment.

18. The apparatus of claim 17, wherein the user equipment comprises components necessary to form a mobile telephone.

19. The apparatus of claim 13, wherein the discontinuous transmission is arranged to reduce interference and therefore increase traffic capacity.

20. A software product for use in providing a traffic signal via high speed packet access, the software product comprising a non-transitory computer readable storage medium having executable codes embedded therein, the code, when executed being adapted to carry out the tasks of:

providing a dedicated channel for transmission of data, wherein the transmission of data is scheduled by a Node B;

gating a dedicated physical control channel to produce a discontinuous transmission, receiving signaling associated with at least one gating pattern for the dedicated physical control channel, and providing a control transmission via the dedicated physical control channel based on the traffic signal transmission on said dedicated channel or the gating pattern, wherein the gating of the dedicated physical control channel is at least partly dependent upon whether the Node B has scheduled the transmission of data on said dedicated channel during the discontinuous transmission, and wherein the data transmission on said dedicated channel controls at least one amount or degree of a plurality of transmission gaps in the discontinuous transmission.

* * * * *